United States Patent
Jaeggle et al.

(10) Patent No.: US 7,603,220 B2
(45) Date of Patent: Oct. 13, 2009

(54) METHOD AND SYSTEM FOR DETECTING DAMAGE DONE TO A CLUTCH HAVING AT LEAST TWO COMPONENTS THAT TRANSFER TORQUE BY FRICTIONAL ENGAGEMENT

(75) Inventors: Gerd Jaeggle, Sasbach (DE); Reinhard Berger, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 231 days.

(21) Appl. No.: 11/334,869

(22) Filed: Jan. 19, 2006

(65) Prior Publication Data
US 2006/0161326 A1 Jul. 20, 2006

(30) Foreign Application Priority Data
Jan. 20, 2005 (DE) ........................ 10 2005 002 590

(51) Int. Cl.
*B60K 23/02* (2006.01)
*F16D 13/60* (2006.01)
(52) U.S. Cl. .................... 701/69; 192/53.1; 192/53.33; 192/70.14; 477/5; 477/6; 477/166
(58) Field of Classification Search .................. 701/69; 477/175, 5, 6, 166; 192/82 T, 53.1, 53.33, 192/70.14; *B60K 23/02; F16D 13/60*
See application file for complete search history.

(56) References Cited

U.S. PATENT DOCUMENTS

| | | | | |
|---|---|---|---|---|
| 6,152,275 | A * | 11/2000 | Fischer et al. | 192/82 T |
| 6,877,595 | B2 * | 4/2005 | Neumann et al. | 192/70.15 |
| 6,938,745 | B2 * | 9/2005 | Ohishi et al. | 192/45 |
| 7,014,024 | B2 * | 3/2006 | Nels et al. | 192/70.12 |
| 7,086,515 | B2 * | 8/2006 | Kelley et al. | 192/48.3 |
| 2002/0014387 | A1 * | 2/2002 | Diemer et al. | 192/107 M |
| 2002/0038747 | A1 * | 4/2002 | Huschka et al. | 192/53.34 |
| 2002/0117370 | A1 * | 8/2002 | Bauer et al. | 192/3.29 |
| 2003/0106759 | A1 * | 6/2003 | Sakai et al. | 192/35 |
| 2007/0173375 | A1 * | 7/2007 | Heber et al. | 477/170 |

FOREIGN PATENT DOCUMENTS

DE 10131434 1/2003

* cited by examiner

*Primary Examiner*—Tuan C To
(74) *Attorney, Agent, or Firm*—Simpson & Simpson, PLLC

(57) ABSTRACT

A method for detecting damage done to a clutch having at least two components that transfer torque by frictional engagement comprises the following steps: determining the friction power L introduced into the friction surfaces of the components by slippage between the torque-transferring components, calculating an individual damage value ESW=f(L,t), wherein t denotes time, and rating the clutch as damaged when ESW exceeds a predetermined value.

20 Claims, 2 Drawing Sheets

METHOD AND SYSTEM FOR DETECTING DAMAGE DONE TO A CLUTCH HAVING AT LEAST TWO COMPONENTS THAT TRANSFER TORQUE BY FRICTIONAL ENGAGEMENT

CROSS REFERENCE TO RELATED APPLICATIONS

This patent application claims priority of German Patent Application No. 10 2005 002 590.0 filed Jan. 20, 2005, which application is incorporated herein by reference.

FIELD OF THE INVENTION

The invention relates to a method and a system for detecting damage done to a clutch having at least two components that transfer torque by frictional engagement.

BACKGROUND OF THE INVENTION

Modern motor vehicles increasingly use automated clutches the friction disks of which are made to transfer torque by motor actuators regulated by a control device. It is important for both the start-up and the gear shifting that the operation of the clutch, namely accurate adjustment of the torque to be transferred, be flawless.

From DE 101 31 434 A1 is known a wear-detection device for a motor vehicle disk clutch whereby, depending on adaptations of the clutch performance curve (for example, resetting of the engagement point of the clutch) a wear index is formed which, for example, indicates the extent to which the clutch is already worn. In addition to the wear index, another operation-dependent clutch value is formed whereby, for example, the temperature of the friction disks is determined and integrated over the time interval during which the temperature exceeds a critical value.

BRIEF SUMMARY OF THE INVENTION

The method of the invention allows instantaneous detection of an inadmissibly high stress exerted on the clutch with inadmissibly high power application to the friction surfaces so that it is possible to undertake instantaneous countermeasures such as reducing the power, or the torque, applied by the driving engine, faster closing of the clutch, etc.

It is advantageous to calculate the individual damage value ESW only during time intervals during which L exceeds a threshold value. For a friction power that is below the threshold value, there is practically no damage to or wear of the clutch. By operating with a programmed permanent microslippage, the said threshold value prevents constant damage or constant energy input.

Advantageously, the function whereby ESW is calculated contains a term of the form $\int L^n dt$ wherein n denotes a number greater than zero.

Moreover, the function whereby ESW is calculated advantageously has the general form: ESW=f(p,T,t) wherein T denotes a quantity corresponding to the temperature of the friction surfaces.

The method of the invention, however, can be developed further by determining a total damage value GSW by summing the individual damage values ESW and rating the friction surfaces as worn when GSW exceeds a limiting value.

In determining GSW, the magnitude of ESW resulting from a previous clutch actuation and the time elapsed since the end of the previous clutch actuation are advantageously taken into account.

The part of the objective of the invention that concerns the said system is reached with the aid of a system for detecting damage done to a clutch having at least two components that transfer torque by frictional engagement, which system contains a device for determining friction power applied to the frictionally engaged friction surfaces of the components and an evaluation unit that determines wear according to one of the aforesaid methods.

Advantageously, the system of the invention contains a device for determining a friction surface temperature and determines the evaluation unit of a single damage value according to the function of general form: ESW=f(L,T,t).

Advantageously, the evaluation unit contains a model that indicates individual damage depending on the duration of the friction power application and another model that indicates individual damage depending on the temperature of the friction surfaces and places the two thus-determined individual damages into a mutual relationship.

The object of the invention is to detect critical load conditions for a clutch which, for example, lead to damage to the clutch as a result of excessive load on the friction lining caused by short-lasting excessive local temperatures, and thus to be able instantly to counteract such critical load conditions.

This objective can be reached with the aid of a method for detecting damage to a clutch having at least two components that transfer torque by frictional engagement, said method comprising the following steps:
 determining the friction power L introduced into the friction surfaces of the components by slippage between the torque-transferring components,
 calculating an individual damage value ESW=f(L,t), wherein t denotes time, and,
 rating the individual damage value for the clutch when ESW exceeds a predetermined value.

BRIEF DESCRIPTION OF THE DRAWINGS

In the following, the invention, which can be applied to virtually all kinds of components that transfer power or torque by friction, will be explained by reference to examples shown by schematic drawings and additional details. In the drawings.

DETAILED DESCRIPTION OF THE INVENTION

Figure 1:
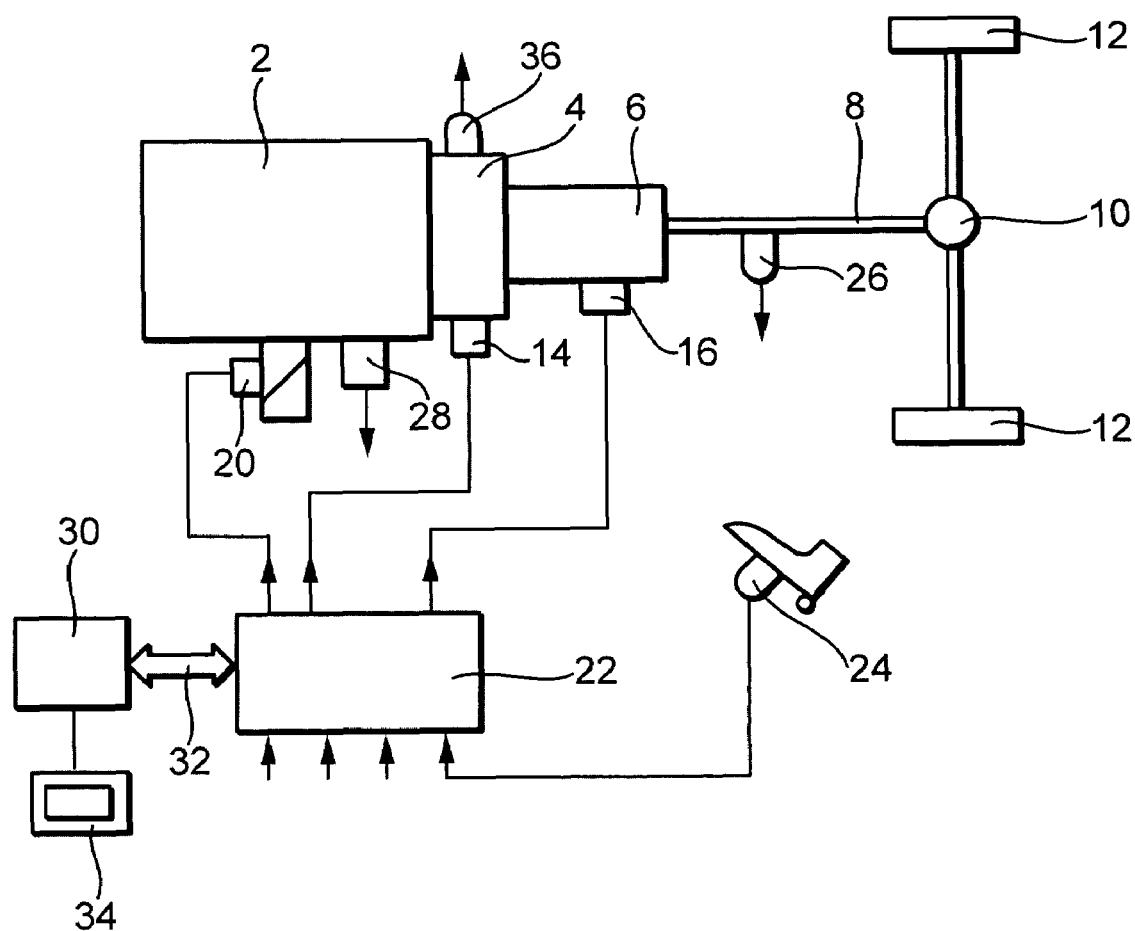
FIG. 1 shows a schematic representation of the drivetrain of a motor vehicle.

According to FIG. 1, a drivetrain of a motor vehicle contains an internal combustion engine 2 which by a clutch 4 and a transmission 6 is connected to a propeller shaft 8 which in turn, through a differential 10, drives the wheels 12 of a motor vehicle. It is understood that the drivetrain can be a drivetrain of a front-wheel drive vehicle or a four-wheel drive vehicle.

Clutch 4 is preferably a friction disk clutch with dry friction disks, said clutch being actuated by an actuator 14.

Transmission 6 can be of any design. It can be a manually shifted transmission, an automated manually shifted transmission, an automatic transmission with planetary gear sets, a continuously variably transmission [CVT], etc. In the example shown here, transmission 6 is, for example, an automated manually shifted transmission actuated by an actuator device 16.

Internal combustion engine 2 has a power control member 18 actuated by actuator 20.

For the actuation of actuators 14, 16 and 20 there is provided an electronic control device 22, containing a microprocessor and program and data memories and the inputs of which are connected with an accelerator pedal sensor 24, a sensor 26 for sensing the speed of rotation of propeller shaft 8, a sensor for sensing the speed of rotation of the crankshaft of the internal combustion engine 2 and optionally other sensors, such as a position sensor for sensing the position of the actuation member of clutch 4, a sensor for sensing the temperature of the internal combustion engine, a sensor for sensing the position of the accelerator pedal, etc. The functions of the electronic control device 22 can be divided among different control devices connected to each other by a bus system. The design and function of the arrangement described to this point are in themselves known and, hence, will not be explained in further detail.

According to the invention, there is provided an evaluation unit 30 which, for example, is integrated into electronic control device 22 or is connected therewith by a bus line 32. With the evaluation unit is connected an indicating unit 34, for example an optical and/or acoustic indicating unit for displaying warning information.

A problem encountered with current drivetrains with automatic or automated clutch 4 is that increased wear occurring in extreme situations is not detected which can lead to damage to the clutch, damage that can be prevented according to the present invention.

Figure 2:
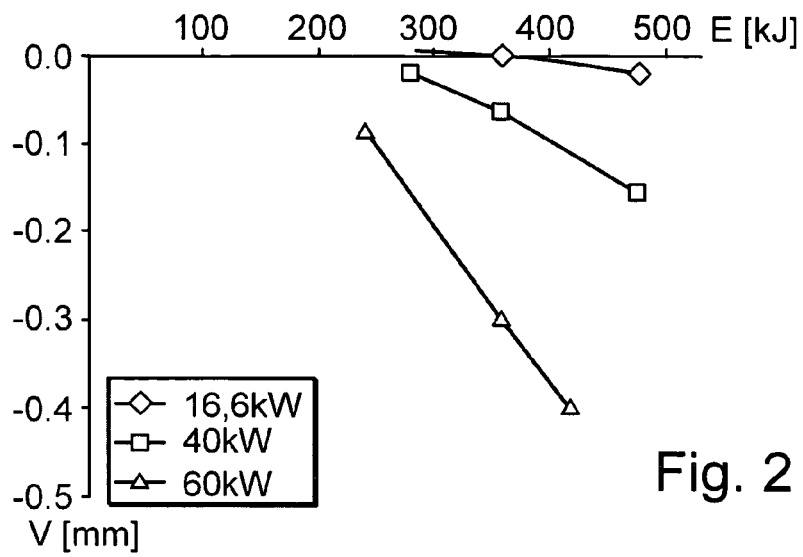
FIG. 2 shows plots indicating the wear of the friction lining for different energy inputs and constant friction power.
Figure 3:
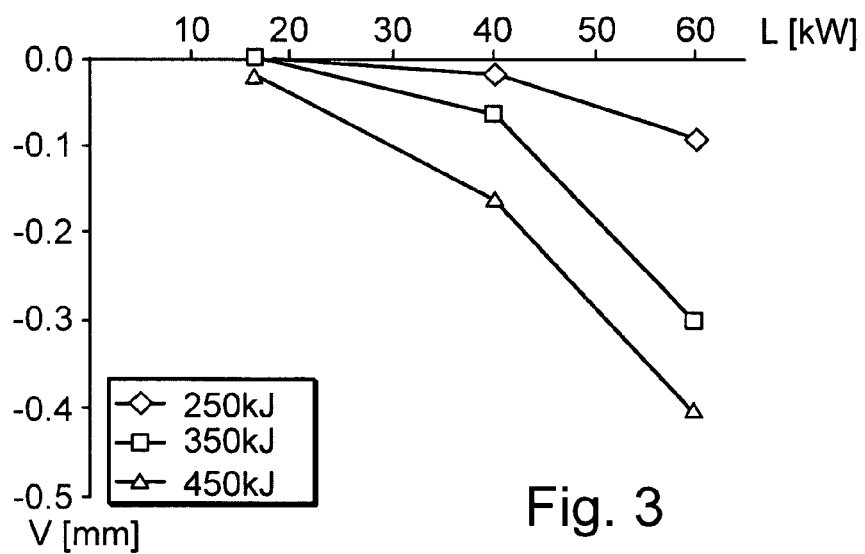
FIG. 3 shows plots indicating the wear of the friction lining for different friction power values and constant energy input; and, FIG. 4 shows a schematic representation intended to explain different clutch protection strategies.

FIGS. 2 and 3 show the results of wear measurements indicated on the ordinate as V in millimeters. The figures represent the wear of the friction lining measured after nine loading cycles. FIG. 2 shows three plots obtained for different energy inputs at constant friction power. FIG. 3 shows three plots for different friction powers transferred at constant energy input. As can be seen, with increasing friction power, wear at constant energy input increases disproportionately.

From the results of the measurements, it is possible to derive the individual damage value ESW as a measure of clutch damage or clutch wear, for example with the aid of the following equations:

$ESW_1 = \int L^2 dt (= L*E)$ $ESW_2 = \int L^3 dt (= L^2*E)$ $ESW_3 = \int L^4 dt (= L^3*E)$ wherein L denotes the slip power and E the slip energy. The expression in parentheses indicates the integral at constant slip power L.

The slip power introduced into the friction disks of a slipping clutch 6 can be calculated in control unit 22 or evaluation unit 30 by, for example, determining the power given off by internal combustion engine 2 to clutch 4 from the torque given off by the internal combustion engine, said torque being determined from the position of the power-setting organ, the temperature and a program map, and the speed of rotation, and by determining the torque acting on the motor vehicle from its traction resistance, for example speed, motor vehicle program map, slope or a torque acting in propeller shaft 8 and the speed of rotation of the propeller shaft. From the difference of the two power values, for which additionally the efficiency of transmission 6 and the losses between transmission and drive gear may be taken into account, it is possible to determine the friction power introduced into clutch 4 on-line, namely without the time delay affecting all temperature measurements made a distance from the friction surfaces.

This friction power is converted practically instantaneously into a temperature increase of the friction surfaces and can be removed only to a limited extent by cooling the clutch. If, as a result, an inadmissibly high temperature arises directly at the friction surfaces which can lead, for example, to a sintering of the material, the clutch is irreversibly damaged. It is therefore advantageous to rate as inadmissibly high clutch stress the stress observed when the friction power during a minimum predetermined time interval exceeds a limiting value that depends on the time interval. Once this inadmissibly high clutch stress has been determined, it is indicated by indicator unit 34, and the electronic control unit applies countermeasures, for example, by reducing the power output of the internal combustion engine and/or by opening the clutch or closing it, depending on the direction in which the friction power input into the clutch decreases.

Overall, it was found advantageous to calculate an individual damage value ESW per clutch actuation or per clutch slippage event according to the equation ESW=f(L,t), where f(L,t) is equal to, or contains at least one term of the form $\int L^n dt$, the integration being performed over the time interval of the power input.

Even more generally, ESW can be calculated as a function ESW=f(L,T,t) wherein T denotes a clutch temperature measured with the aid of an additional sensor 36 so that the friction power input is, for example, rated the higher the more the measured clutch temperature increases. The clutch temperature can also be determined from a clutch model by calculating the clutch temperature for the particular clutch from the temperature variation of the friction power.

By summation or integration of the individual damage values, it is possible to determine a total damage value for the clutch indicating the total wear of the clutch. If in the calculation of the individual damage values ESW the temperature was not also taken into account, it is advantageous, in the integration or addition of the individual damage values, to take into account the time elapsed between two clutch actuations by not setting to zero the individual damage value immediately after the end of the clutch actuation but to reduce it to zero gradually according to a time function. This time function can be linear, a polynomial, a time-lag element or an exponential function. After a subsequent clutch actuation, the calculation of the individual damage values ESW then starts with the value to which the individual damage value from the previous clutch actuation had decreased. The time elapsed between two events or clutch actuations can also be taken into account in the temperature-dependent calculation of the damage value.

Figure 4:
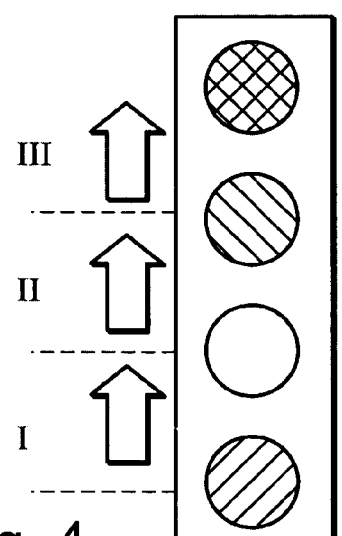

The clutch-protection strategy will be explained schematically by reference to FIG. 4.

In the traffic-light representation, the endangering of the clutch increases from bottom to top. Region I represents, for example, a region in which at a normal clutch actuation process according to the equation ESW=$\int L^3 dt = (L^2*E)$ there is obtained an individual damage value ESW of less than, for example, 1.5 kW²kJ/(cm⁴kg), or a temperature of less than 250° C. at a depth of 4 mm is obtained from a temperature model. Region I represents normal clutch actuation so that no clutch protection is needed.

In region II, the ESW values are above 1.5 kW²kJ/(cm⁴kg) and, for example, below 2.2 kW²kJ/cm⁴kg or the temperature of, for example, a pressure plate of the clutch at a depth of 4 mm below the friction surface is between 250° C. and 300° C. At the upper limit of this region II, a clutch protection strategy is needed, namely it is necessary to prevent the ESW from reaching this value, for example by electronically reducing the power of the internal combustion engine.

Still higher individual damage values or temperatures would cause fading of the clutch which would endanger both the clutch and the operational safety of the motor vehicle.

REFERENCE NUMERALS 2 internal combustion engine
4 clutch
6 transmission
8 propeller shaft
10 differential
12 wheel
14 actuator
16 actuator device
18 power-adjusting element
20 actuator
22 electronic control device
24 accelerator pedal sensor
26 sensor
28 sensor
30 evaluation unit
32 bus line
34 indicating unit
36 sensor

What is claimed is:

1. A method for detecting damage to a clutch having at least two components that transfer torque by frictional engagement, comprising the following steps:
determining by an evaluation unit, the friction power L introduced into the friction surfaces of the components by slippage between the torque-transferring components,
calculating by the evaluation unit, an individual damage value ESW according to the function ESW=f(L,t) wherein t denotes the time,
rating, by the evaluation unit, as clutch damage, any individual damage value ESW exceeding a predetermined value, and
activating countermeasures if the individual damage value ESW exceeds the predetermined value, wherein the countermeasures directly or indirectly manipulate the clutch to prevent further damage to the clutch.

2. The method defined in claim 1 whereby the individual damage value ESW is calculated only during the time interval in which friction power L exceeds a threshold value.

3. The method defined in claim 1 wherein the stress exerted on the clutch is rated as inadmissibly high when the friction power L during a time interval exceeds the limiting value that depends on the time interval.

4. The method defined in claim 1 wherein the function whereby ESW is calculated contains at least one term of the form $\int L^n dt$, with n denoting a number greater than zero.

5. The method defined in claim 1 wherein the function whereby ESW is calculated has the general form:

$$ESW = f(L, T, t)$$

wherein T is a quantity corresponding to the clutch temperature.

6. The method defined in claim 1 wherein a total damage value GSW of the clutch is determined by summing the individual damage values, and the friction surfaces are rated as being worn when the GSW exceeds a limiting value.

7. The method defined in claim 6 wherein in the determination of GSW the magnitude of ESW from a previous clutch actuation and the time interval since the end of the previous clutch actuation are taken into account.

8. The method recited in claim 1 wherein the countermeasures are selected from the group consisting of reducing the power to a driving engine coupled to the clutch, quickly closing the clutch, and quickly opening the clutch.

9. A system for detecting damage to a clutch having at least two components that transfer torque by frictional engagement, comprising:
a device configured to determine the friction power that is introduced into frictionally engaged friction surfaces of the components; and,
an evaluation unit configured to:
determine the friction power L introduced into the friction surfaces of the components by slippage between the torque-transferring components,
calculate an individual damage value ESW according to the function ESW=f(L,t) wherein t denotes the time, and
rate as individual clutch damage ESW values exceeding a predetermined value.

10. The system as defined in claim 9 comprising a device for determining a clutch temperature, wherein the function whereby ESW is calculated has the general form:

$$ESW = f(L, T, t)$$

wherein T is a quantity corresponding to the clutch temperature.

11. The system as defined in claim 10 wherein the evaluation unit contains a model indicating an individual damage that depends on the time variation of the friction power, and a model that indicates an individual damage that depends on the temperature of the friction surfaces, and which evaluation unit places the two individual damages thus determined into a mutual relationship.

12. The system recited in claim 9 wherein the system activates countermeasures to prevent damage to the clutch as a result of the individual damage values exceeding the predetermined value.

13. The system recited in claim 12 wherein the countermeasures are selected from the group consisting of reducing the power to a driving engine coupled to the clutch, quickly closing the clutch, and quickly opening the clutch.

14. A method for detecting damage to a clutch having at least two components that transfer torque by frictional engagement, comprising the following steps:
determining by an evaluation unit the friction power L introduced into the friction surfaces of the components by slippage between the torque-transferring components;
calculating, by the evaluation unit, an individual damage value ESW according to the function ESW=f(L,t) wherein t denotes the time;
rating by the evaluation unit, as clutch damage, any individual damage value ESW exceeding a predetermined value; and
providing a visual or audible warning that clutch damage has occurred via an indicator unit.

15. The method defined in claim 14 whereby the individual damage value ESW is calculated only during the time interval in which friction power L exceeds a threshold value.

16. The method defined in claim 14 wherein the stress exerted on the clutch is rated as inadmissibly high when the friction power L during a time interval exceeds the limiting value that depends on the time interval.

17. The method defined in claim 14 wherein the function whereby ESW is calculated contains at least one term of the form $\int L^n dt$, with n denoting a number greater than zero.

18. The method defined in claim 14 wherein the function whereby ESW is calculated has the general form:

$$ESW = f(L, T, t)$$

wherein T is a quantity corresponding to the clutch temperature.

19. The method defined in claim 14 wherein a total damage value GSW of the clutch is determined by summing the individual damage values, and the friction surfaces are rated as being worn when the GSW exceeds a limiting value.

20. The method defined in claim 19 wherein in the determination of GSW the magnitude of ESW from a previous clutch actuation and the time interval since the end of the previous clutch actuation are taken into account.

* * * * *